United States Patent
Chen et al.

(10) Patent No.: US 9,852,101 B2
(45) Date of Patent: Dec. 26, 2017

(54) ELECTRONIC DEVICE WITH ENHANCED MANAGEMENT DATA INPUT/OUTPUT CONTROL

(71) Applicant: MEDIATEK INC., Hsin-Chu (TW)

(72) Inventors: Shin-Shiun Chen, Taipei (TW); Chen-Hao Chang, Taipei (TW); Hong-Ching Chen, Kao-Hsiung (TW); Yao-Chun Su, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 278 days.

(21) Appl. No.: 14/583,206

(22) Filed: Dec. 26, 2014

(65) Prior Publication Data
US 2015/0339253 A1 Nov. 26, 2015

Related U.S. Application Data

(60) Provisional application No. 62/003,018, filed on May 26, 2014.

(51) Int. Cl.
| | |
|---|---|
| *G06F 13/00* | (2006.01) |
| *G06F 3/00* | (2006.01) |
| *G06F 12/00* | (2006.01) |
| *G06F 13/28* | (2006.01) |
| *G06F 13/42* | (2006.01) |
| *G06F 13/364* | (2006.01) |

(52) U.S. Cl.
CPC ........ *G06F 13/4221* (2013.01); *G06F 13/364* (2013.01)

(58) Field of Classification Search
CPC ........ G06F 3/0659; G06F 3/061; G06F 13/28; G06F 13/1657; G11C 16/10
USPC ...................... 710/5, 110; 711/103
See application file for complete search history.

(56) References Cited

U.S. PATENT DOCUMENTS

| | | | | |
|---|---|---|---|---|
| 5,761,454 A | * | 6/1998 | Adusumilli | G06F 13/4226 710/105 |
| 5,835,738 A | * | 11/1998 | Blackledge, Jr. | G06F 13/404 710/307 |
| 6,089,453 A | * | 7/2000 | Kayser | G06K 17/00 235/378 |
| 6,298,370 B1 | * | 10/2001 | Tang | G06F 9/5044 718/100 |
| 6,385,669 B1 | * | 5/2002 | Creedon | H04L 12/40039 370/445 |
| 6,874,052 B1 | * | 3/2005 | Delmonico | G06F 13/4045 710/110 |
| 2003/0200374 A1 | * | 10/2003 | Moriwaki | H04L 12/40013 710/305 |
| 2005/0229029 A1 | * | 10/2005 | Carr | G06F 11/0793 714/38.14 |
| 2008/0107188 A1 | * | 5/2008 | Kennedy | H04B 1/7163 375/259 |
| 2010/0235555 A1 | * | 9/2010 | Nguyen | G06F 13/4027 710/110 |

(Continued)

*Primary Examiner* — Faisal M Zaman
(74) *Attorney, Agent, or Firm* — Winston Hsu

(57) ABSTRACT

An electronic device has a management data input/output (MDIO) bus, a control unit, and an MDIO master. The control circuit receives a host command from a host device, and outputs a plurality of MDIO commands in response to the host command. The MDIO master receives the MDIO commands from the control circuit, and transmits the MDIO commands to the MDIO bus.

4 Claims, 12 Drawing Sheets

(56) References Cited

U.S. PATENT DOCUMENTS

| | | | | |
|---|---|---|---|---|
| 2011/0142022 A1* | 6/2011 | Kubo | ............... | H04N 21/4122 |
| | | | | 370/338 |
| 2011/0153891 A1* | 6/2011 | Ebina | ............... | H04L 12/2814 |
| | | | | 710/110 |
| 2011/0270599 A1* | 11/2011 | Park | ............... | G11C 29/08 |
| | | | | 703/15 |
| 2012/0066423 A1* | 3/2012 | Choo | ............... | G06F 13/4291 |
| | | | | 710/110 |
| 2014/0244910 A1* | 8/2014 | Tanaka | ............... | H04B 10/40 |
| | | | | 711/103 |
| 2014/0351456 A1* | 11/2014 | Sharifie | ............... | G06F 3/0613 |
| | | | | 710/5 |
| 2015/0339253 A1* | 11/2015 | Chen | ............... | G06F 13/364 |
| | | | | 710/110 |
| 2016/0205066 A1* | 7/2016 | Attarwala | ............... | H04L 12/40 |
| | | | | 709/208 |

\* cited by examiner

ELECTRONIC DEVICE WITH ENHANCED MANAGEMENT DATA INPUT/OUTPUT CONTROL

CROSS REFERENCE TO RELATED APPLICATIONS

This application claims the benefit of U.S. provisional application No. 62/003,018, filed on May 26, 2014 and incorporated herein by reference.

BACKGROUND

The present invention relates to controlling a read/write operation to be executed by a slave device on a bus, and more particularly, to an electronic device with enhanced management data input/output control.

Management data input/output (MDIO) interface is specified in the IEEE 802.3 standard and intended to provide a serial interface to transfer management data between a media access control (MAC) layer and a physical (PHY) layer. The MDIO interface includes two pins, a bidirectional MDIO pin coupled to an MDIO bus and a management data clock (MDC) pin coupled to an MDC bus. The MDC is usually provided by a MDIO master and sourced to all MDIO slaves on an MDIO bus controlled by the MDIO master. A device with the MDIO master that controls the MDIO bus is called a station management entity (STA), while a device with the MDIO slave being managed is called an MDIO manageable device (MMD). To put it another way, the STA is embedded in the MAC layer and acts as a master for MDIO interface, and the MMD is embedded in the PHY device and acts as a slave on the MDIO interface. One MDIO master is allowed to be coupled to a plurality of MDIO slaves through an MDIO bus. The MDIO bus is a relatively slow interface. However, its ability to access and modify various registers in PHY devices (i.e., MDIO slaves) by the MDIO master can extend the application of a network device using the MDIO interface.

If the MDIO master is required to send a write command accompanied with the same write data to each of a plurality of MDIO slaves on the MIDO bus, the MDIO master has to send the write command several times due to the fact that the MDIO slaves have different designated physical (port) addresses and a write command for a particular physical (port) address is executed by one of the MDIO slaves only. In addition, there are no error check mechanism and write-incremental function supported by the MDIO interface specified in the IEEE 802.3 standard. Hence, there is a need for an innovative design which is capable of achieving enhanced MDIO control over MDIO slaves on the MDIO bus.

SUMMARY

One of the objectives of the claimed invention is to provide an electronic device with enhanced management data input/output control.

According to a first aspect of the present invention, an exemplary electronic device is disclosed. The exemplary electronic device includes a management data input/output (MDIO) bus, a control circuit, and an MDIO master. The control circuit is configured to receive a host command from a host device, and output a plurality of MDIO commands in response to the host command. The MDIO master is configured to receive the MDIO commands from the control circuit, and transmit the MDIO commands to the MDIO bus.

According to a second aspect of the present invention, an exemplary electronic device is disclosed. The exemplary electronic device includes a management data input/output (MDIO) bus, and MDIO master, and a first MDIO slave. The MDIO master is configured to generate an MDIO command for the MDIO bus, wherein the MDIO command includes a target physical (PHY) layer address. The first MDIO slave is configured to have a first designated physical layer address and a pre-defined address setting, wherein when the target physical layer address included in the MDIO command is different from the first designated physical layer address but matches the pre-defined address setting, the first MDIO slave is activated to execute the MDIO command received from the MDIO bus.

According to a third aspect of the present invention, an exemplary electronic device is disclosed. The exemplary electronic device includes a management data input/output (MDIO) bus, an MDIO mater, and a plurality of MDIO slaves. The MDIO master is configured to generate an MDIO command for the MDIO bus, wherein the MDIO command includes a target physical layer address. The MDIO slaves are configured to have different designated physical layer addresses, wherein when the target physical layer address included in the MDIO command is set by a reserved physical layer address different from the designated physical layer addresses, each of the MDIO slaves is activated to execute the MDIO command received from the MDIO bus.

According to a fourth aspect of the present invention, an exemplary electronic device is disclosed. The exemplary electronic device includes a management data input/output (MDIO) bus, an MDIO master, and a first MDIO slave. The MDIO master is configured to generate an MDIO command for the MDIO bus, wherein the MDIO command includes a target physical layer address and a target device address. The first MDIO slave is configured to have a first designated physical layer address and a pre-defined address setting, wherein when the target physical layer address included in the MDIO command is different from the first designated physical layer address and the target device address included in the MDIO command matches the pre-defined address setting, the first MDIO slave is activated to execute the MDIO command received from the MDIO bus.

According to a fifth aspect of the present invention, an exemplary electronic device is disclosed. The exemplary electronic device includes a management data input/output (MDIO) bus and an MDIO master. The MDIO master is configured to generate a plurality of successive MDIO commands, including a set-address command and a plurality of write commands following the set-address command, to the MDIO bus.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
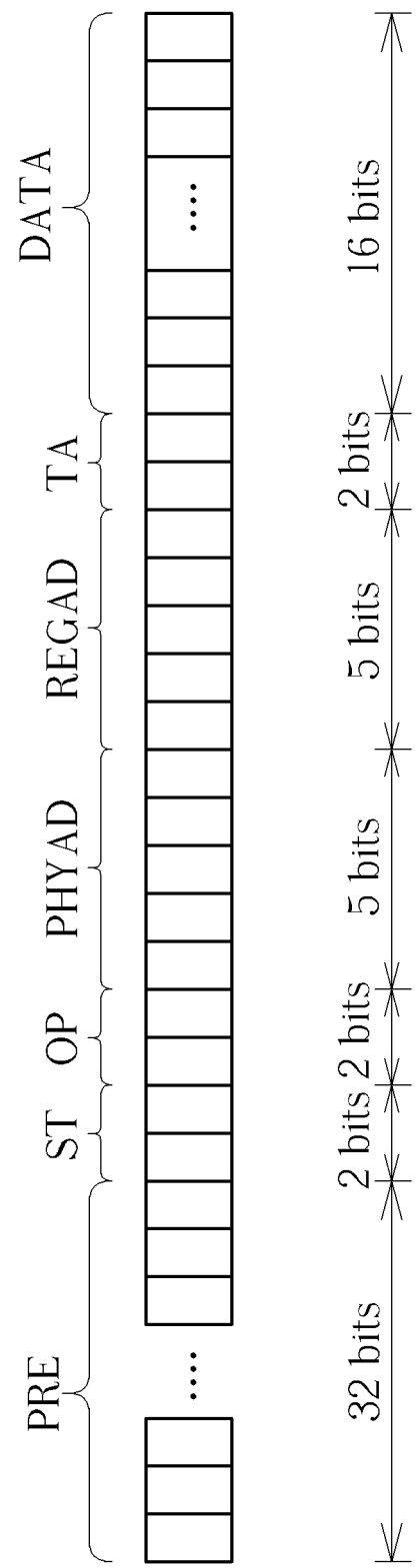
FIG. 1 is a diagram illustrating a structure of an MDIO frame defined in Clause 22 of IEEE 802.3 standard.

MDIO as originally defined in Clause 22 of IEEE 802.3 standard enables an STA (e.g., an MDIO master) to access up to 32 registers in 32 different PHY devices (e.g., MDIO slaves). More specifically, up to 32 PHY devices are supported per Clause 22 STA, and up to 32 registers are supported per Clause 22 PHY device. The STA initializes an MDIO command by using an MDIO frame, and provides PHY (port) address and register address to perform register read or write operation. FIG. 1 is a diagram illustrating a structure of an MDIO frame defined in Clause 22 of IEEE 802.3 standard. The preamble field "PRE" is to initialize the transaction by using 32 bits of 1's. The start of frame field "ST" is set by 01. The opcode field field nally defined in Clause 22 of IEEE 802.3 standard enables an STA (e.g., an MDIO master) to access up toned in Clause 22 of IEEE 802.3 standard include a write command with OP=01 and a read command with OP=10. The PHY address (i.e., port address) field "PHYAD" defines a target PHY (port) address of an MDIO slave to be accessed. The register address field "REGAD" defines a target register address of a register implemented in the MDIO slave with the target PHY (port) address. The turnaround time field "TA" has 2 bits to provide some turnaround time for the MDIO bus to avoid contention during a read operation. For a read operation, TA[1:0]=Z0. For a write operation, TA[1:0]=10. Hence, concerning a read transaction, both of the MDIO master and the MDIO slave shall remain in a high impedance state Z for the first bit time of the turnaround. The MDIO slave shall drive one bit "0" during the second bit time of the turnaround. Concerning a write transaction, the MDIO master shall drive one bit "1" for the first bit time of the turnaround, and then drive another bit "0" for the second bit time of the turnaround. The data field "DATA" has a 16-bit write data driven by the MDIO master in the write operation, and has a 16-bit read data driven by the MDIO slave in the read operation.

Figure 2:
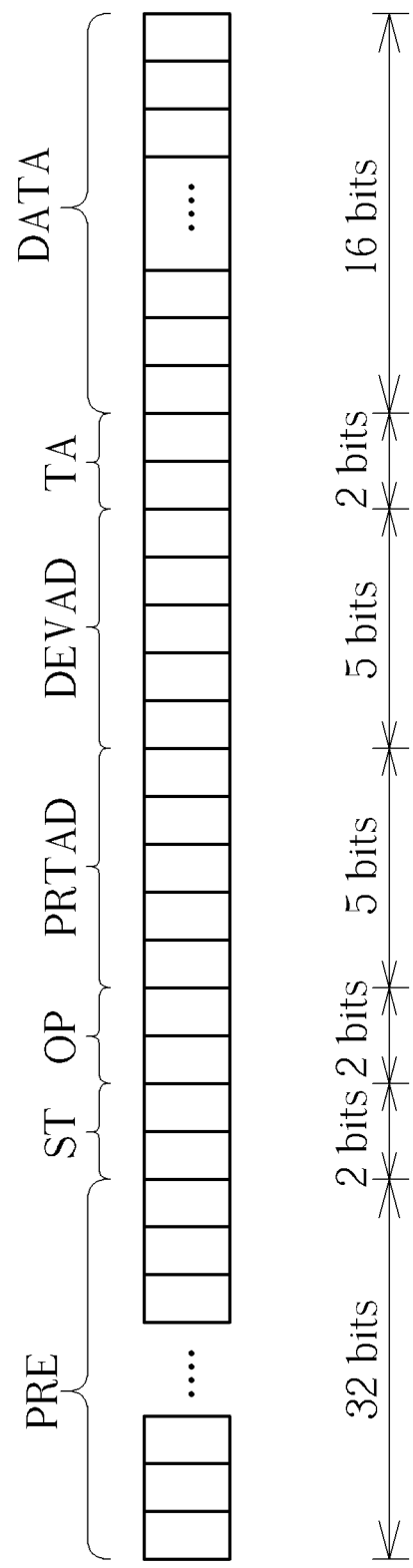
FIG. 2 is a diagram illustrating a structure of an MDIO frame defined in Clause 45 of IEEE 802.3 standard.

To address the limitations of Clause 22 of IEEE 802.3 standard, the Clause 45 is added to IEEE 802.3 standard for extending the existing frame format to give provision to access 32 PHY devices, 32 different device types, and 64K registers in each of these PHY devices. More specifically, up to 32 PHY devices are supported per Clause 45 STA, up to 32 devices are supported per Clause 45 PHY device, and up to 65536 registers are supported per Clause 45 device. FIG. 2 is a diagram illustrating a structure of an MDIO frame defined in Clause 45 of IEEE 802.3 standard. The preamble field "PRE" is to initialize the transaction by using 32 bits of 1's. The start of frame field "ST" is set by 00. The opcode field "OP" is set by 00 for a set-address operation, set by 01 for a write operation, set by 10 for a read operation, and set by 10 for a read and post address increment operation. Hence, the MDIO commands defined in Clause 45 of IEEE 802.3 standard include a set-address command with OP=00, a write command with OP=01, a read command with OP=10, and a post-read-increment-address command with OP=10. The port address (i.e., PHY address) field "PRTAD" defines a target PHY (port) address of an MDIO slave to be accessed. The device address field "DEVAD" defines a target device address of a device used in the MDIO slave with the target PHY (port) address. The turnaround time field "TA" has 2 bits set by 10 for either of the set-address command and the write command, and has 2 bits set by Z0 for either of the read command and the post-read-increment-address command. The data field "DATA" has a 16-bit address data driven by the MDIO master in the set-address operation, a 16-bit write data driven by the MDIO master in the write operation, a 16-bit read data driven by the MDIO slave in the read operation, and a 16-bit read data driven by the MDIO slave in the read and post address increment operation.

Based on the MDIO frame structures defined in Clause 22 and Clause 45 of IEEE 802.3 standard, a host device needs to send a plurality of write commands to an MDIO master, and the MDIO master has to sequentially send write commands, so as to write the same data into registers of different MDIO slaves. The present invention therefore proposes an electronic device with enhanced MDIO control to achieve the multicast/broadcast function.

Figure 3:
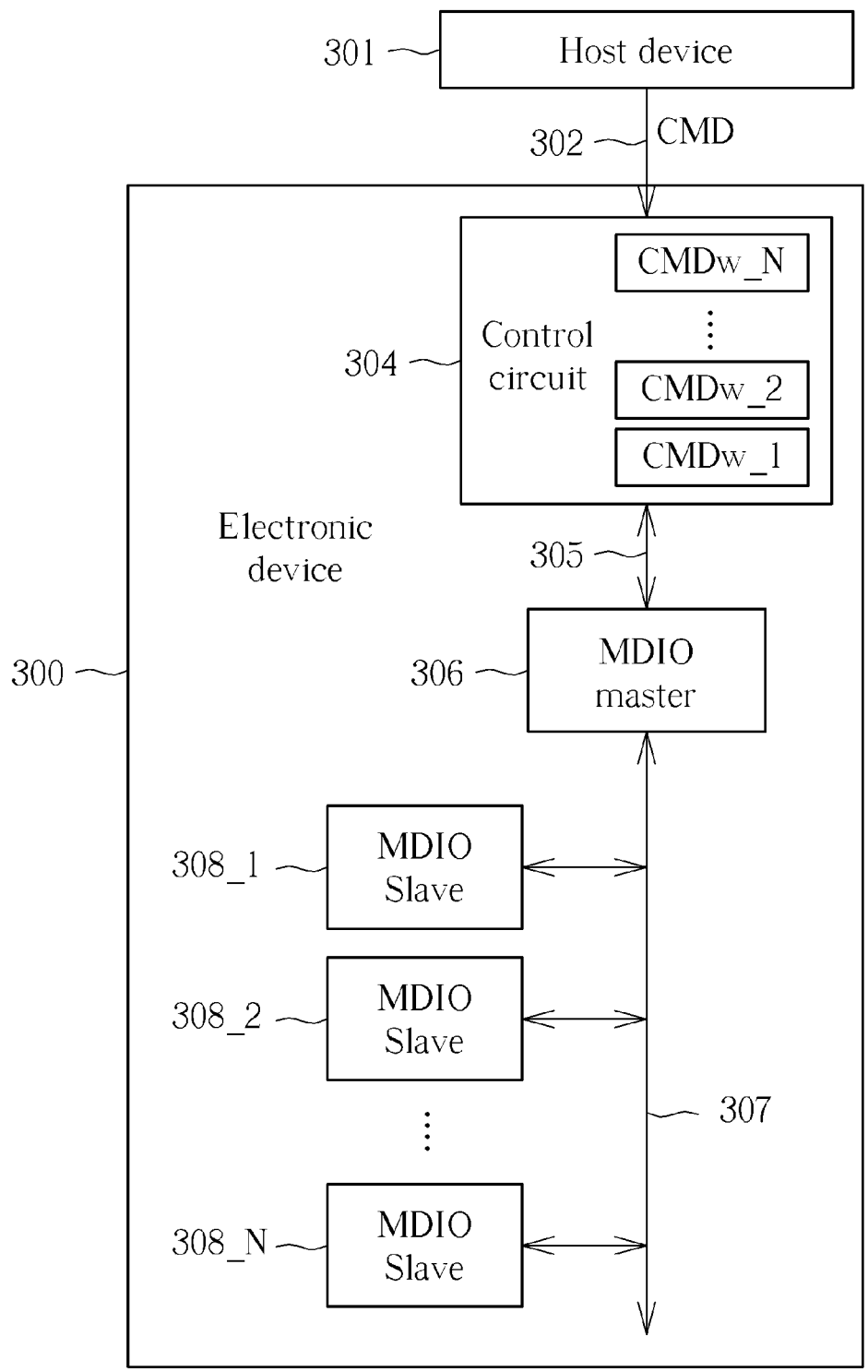
FIG. 3 is a diagram illustrating an electronic device according to a first embodiment of the present invention.

FIG. 3 is a diagram illustrating an electronic device according to a first embodiment of the present invention. In this embodiment, the electronic device 300 may be a network device (e.g., a switch). The electronic device 300 communicates with a host device (e.g., a host processor) 301 via a bus 302. For example, the bus 302 may be a PCI Express (Peripheral Component Interconnect Express) bus. The electronic device 300 includes a control circuit 304, an internal bus 305, an MDIO master 306, an MDIO bus 307, and a plurality of MDIO slaves 308_1, 308_2, . . . 308_N. It should be noted that only the components pertinent to the present invention are shown in FIG. 3. For example, the MDC bus is not shown for clarity and simplicity. In practice, the electronic device 300 may include additional components to achieve other functions. Further, the number of MDIO slaves on the MDIO bus 307 may be adjusted, depending upon actual design consideration.

The control circuit 304 receives a host command CMD (such as a single command) generated from the host device

301 and transmitted via the bus 302. Next, the control circuit 304 parses the host command CMD, translates it into several MDIO commands such as write commands $CMD_{W\_}1$, $CMD_{W\_}2, \ldots CMD_{W\_}N$, and outputs the write commands $CMD_{W\_}1$-$CMD_{W\_}N$ to the MDIO mater 306 via the internal bus 305. The MDIO master 306 receives the write commands $CMD_{W\_}1$-$CMD_{W\_}N$ from the control circuit 304, and transmits the write commands $CMD_{W\_}1$-$CMD_{W\_}N$ to the MDIO bus 307, where the transmission of each write command has a corresponding MDIO frame structure defined by Clause 22/Clause 45 of IEEE 802.3 standard.

In one exemplary design, the host command CMD is a broadcast command for writing the same write data into registers of all MDIO slaves 308_1-308_N on the same MDIO bus 307 controlled by the MDIO master 306. Hence, the write commands $CMD_{W\_}1$-$CMD_{W\_}N$ are configured to be executed by the MDIO slaves 308_1-308_N, respectively. It should be noted that the host device 301 only needs to generate and transmit one broadcast command CMD to the electronic device 300. In this way, the bandwidth of the bus 302 and the computing resource of the host device 301 can be saved greatly. Though the host device 301 only generates one broadcast command CMD, the broadcast function for MDC/MDIO protocol is achieved through the control circuit 304 that is capable of automatically generating needed write commands (e.g., $CMD_{W\_}1$-$CMD_{W\_}N$) based on a parsing result of the single broadcast command CMD.

Figure 4:
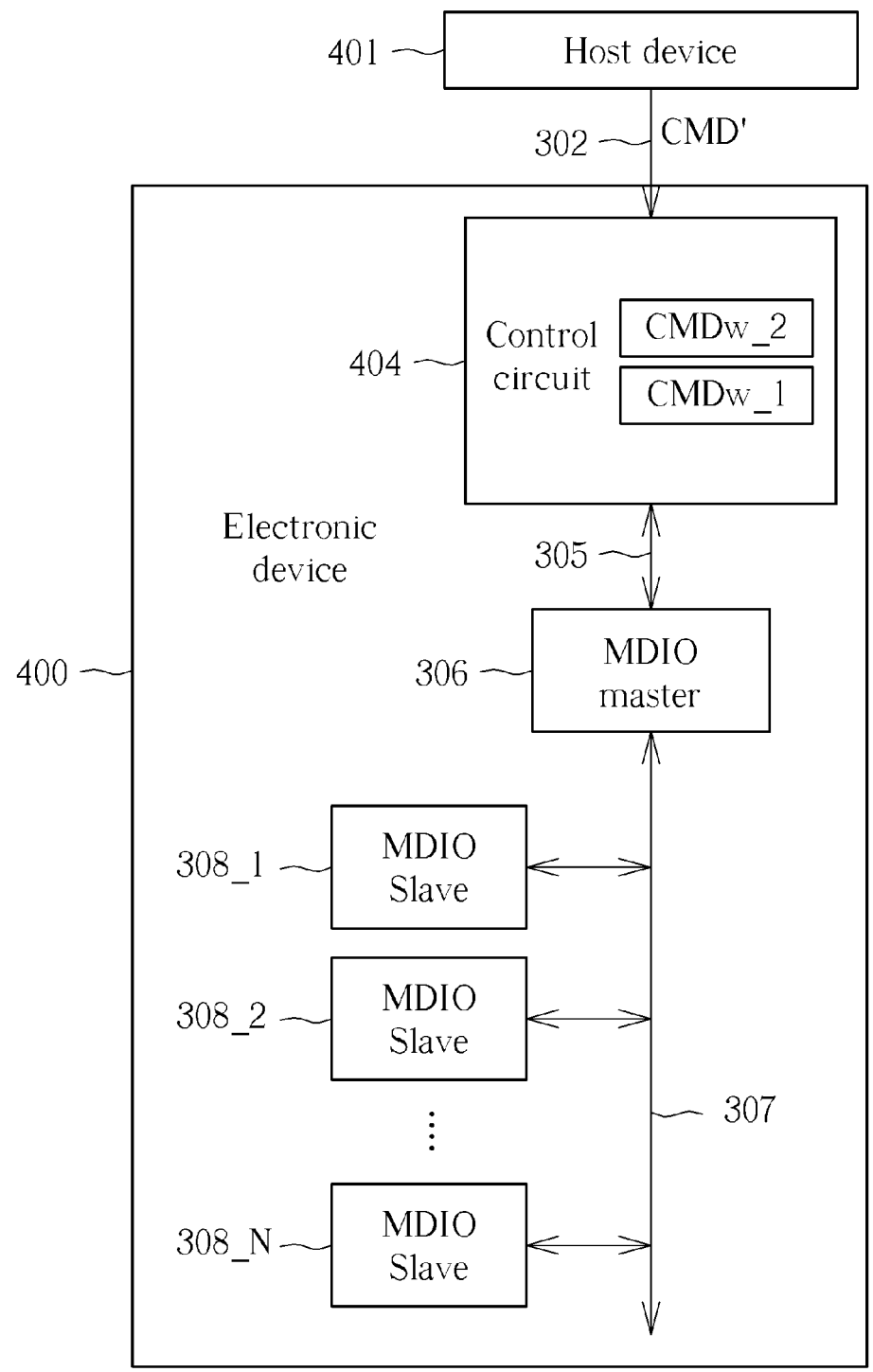
FIG. 4 is a diagram illustrating an electronic device according to a second embodiment of the present invention.

FIG. 4 is a diagram illustrating an electronic device according to a second embodiment of the present invention. In this embodiment, the electronic device 400 may be a network device (e.g., a switch). The major difference between the electronic devices 300 and 400 is that the control circuit 404 parses the host command CMD' (e.g., a single command) generated from the host device (e.g., a host processor) 401, translates it into several MDIO commands such as write commands $CMD_{W\_}1$ and $CMD_{W\_}2$, and outputs the write commands $CMD_{W\_}1$ and $CMD_{W\_}2$ to the MDIO mater 306. The MDIO master 306 receives the write commands $CMD_{W\_}1$ and $CMD_{W\_}2$ from the control circuit 404, and transmits the write commands $CMD_{W\_}1$ and $CMD_{W\_}2$ to the MDIO bus 307, where the transmission of each write command has a corresponding MDIO frame structure defined by Clause 22/Clause 45 of IEEE 802.3 standard.

In one exemplary design, the host command CMD' is a multicast command for writing the same write data into registers of some of the MDIO slaves 308_1-108_N on the same MDIO bus 307 controlled by the MDIO master 306. In this example, the write commands $CMD_{W\_}1$ and $CMD_{W\_}2$ are configured to be executed by the MDIO slaves 308_1 and 308_2, respectively. It should be noted that the host device 401 only needs to generate and transmit one multicast command CMD' to the electronic device 400. In this way, the bandwidth of the bus 302 and the computing resource of the host device 401 can be saved. Though the host device 401 only generates one multicast command CMD', the multicast function for MDC/MDIO protocol is achieved through the control circuit 404 that is capable of automatically generating needed write commands (e.g., $CMD_{W\_}1$ and $CMD_{W\_}2$) based on a parsing result of the single multicast command CMD'.

In above examples shown in FIG. 3 and FIG. 4, the MDIO master 306 still needs to send several MDIO commands to achieve the broadcast/multicast function. The present invention further proposes properly configuring the MDIO slaves to thereby allow an MDIO master to send a single MDIO command to achieve the broadcast/multicast function.

Figure 5:
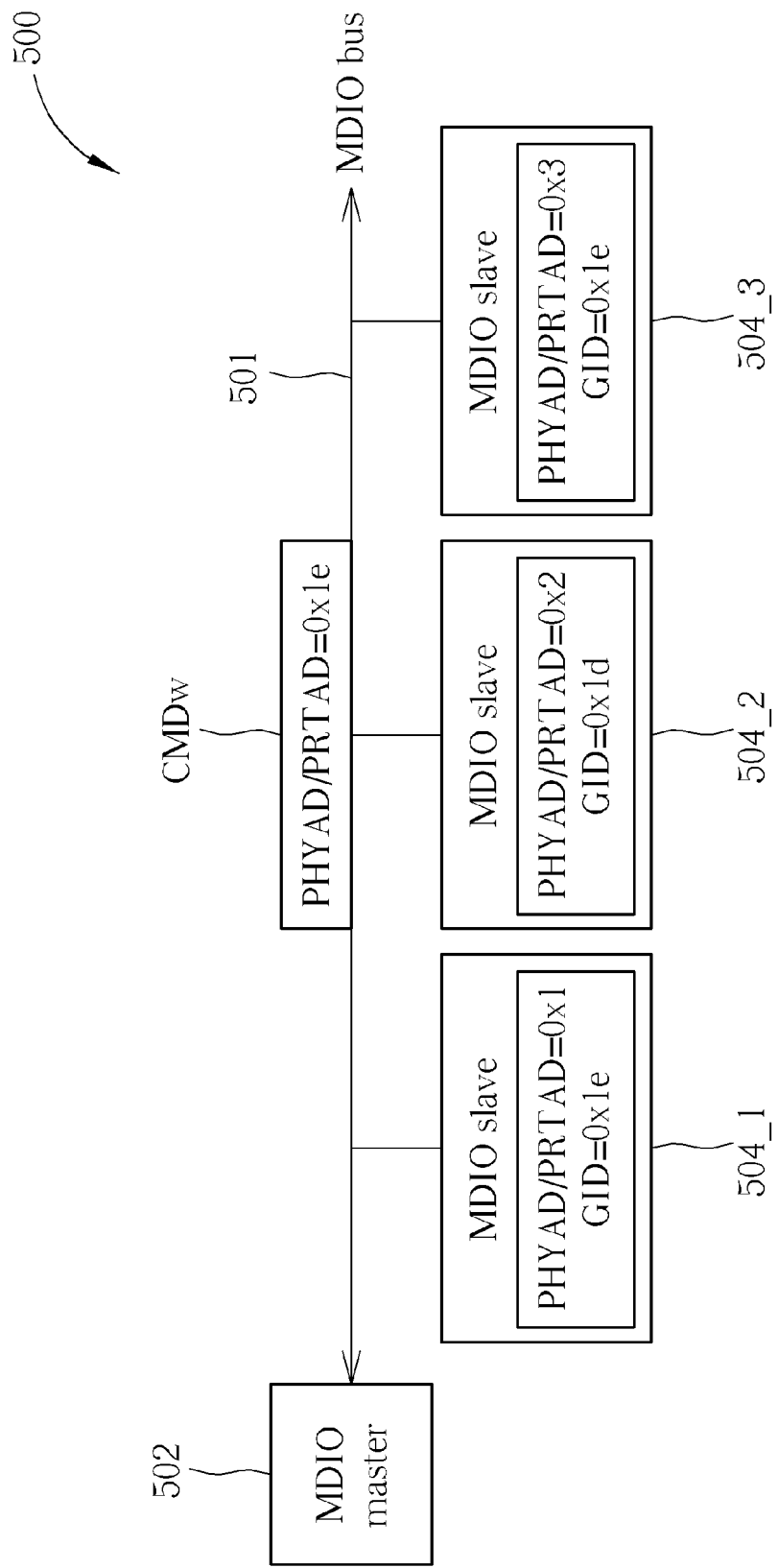
FIG. 5 is a diagram illustrating an electronic device according to a third embodiment of the present invention.

FIG. 5 is a diagram illustrating an electronic device according to a third embodiment of the present invention. In this embodiment, the electronic device 500 may be a network device (e.g., a switch). The electronic device 500 includes an MDIO bus 501, an MDIO master 502, and a plurality of MDIO slaves 504_1, 504_2, and 504_3. It should be noted that only the components pertinent to the present invention are shown in FIG. 5. For example, the MDC bus is not shown for clarity and simplicity. In practice, the electronic device 500 may include additional components to achieve other functions. Further, only three MDIO slaves are coupled to the same MDIO bus 501 controlled by the MDIO master 502. However, the number of MDIO slaves on the MDIO bus 501 may be adjusted, depending upon actual design consideration.

In this embodiment, each of the MDIO slaves 504_1-504_3 is configured to have a designated physical layer address PHYAD (or called a port address PRTAD) and a pre-defined address setting, where the pre-defined address setting is a special physical layer (port) address acting as a group identifier (GID) used to define which MDIO slaves belong to the same group. As shown in FIG. 5, the MDIO slave 504_1 has a designated physical layer (port) address set by 0x1 and a GID set by 0x1e; the MDIO slave 504_2 has a designated physical layer (port) address set by 0x2 and a GID set by 0x1d; and the MDIO slave 504_3 has a designated physical layer (port) address set by 0x3 and a GID set by 0x1e. Hence, the MDIO slaves 504_1 and 504_3 are categorized into the same group due to having the same group identifier (i.e., GID=0x1e).

In this example shown in FIG. 5, the MDIO master 502 generates an MDIO command (e.g., a write command $CMD_W$) to the MDIO bus 501, where the transmission of the write command $CMD_W$ has a corresponding MDIO frame structure defined by Clause 22/Clause 45 of IEEE 802.3 standard. The write command $CMD_W$ has a physical layer (port) address set by 0x1e that is different from the designated physical layer (port) addresses possessed by the MDIO slaves 504_1-504_3. In accordance with a conventional design, none of the MDIO slaves 504_1-504_3 is activated to execute the write command $CMD_W$. However, in accordance with the proposed design of the present invention, the physical layer (port) address included in the write command $CMD_W$ matches a pre-defined address setting (i.e., GID=0x1e) possessed by each of the MDIO slaves 504_1 and 504_3. Hence, each of the MDIO slaves 504_1 and 504_3 is activated to execute the same write command $CMD_W$, thus achieving the multicast function. Specifically, the number of MDIO slaves 504_1 and 504_3, each coupled to the MDIO bus 501 and having the same pre-defined address (i.e., GID=0x1e) is smaller than the number of all MDIO slaves 504_1-504_3 on the same MDIO bus 501 controlled by the MDIO master 502. When an MDIO command is controlled to have a physical layer (port) address set by GID=0x1e, the multicast function of the MDIO command is enabled.

Consider another case where the write command $CMD_W$ has a physical layer (port) address set by 0x1d that is different from the designated physical layer (port) addresses possessed by the MDIO slaves 504_1-504_3. In accordance with a conventional design, none of the MDIO slaves 504_1-504_3 is activated to execute the write command $CMD_W$. However, in accordance with the proposed design of the present invention, the physical layer (port) address included in the write command $CMD_W$ matches a pre-defined address setting (i.e., GID=0x1d) possessed by the MDIO slave 504_2. Hence, the MDIO slave 504_2 is activated to execute the write command $CMD_W$.

Figure 6:
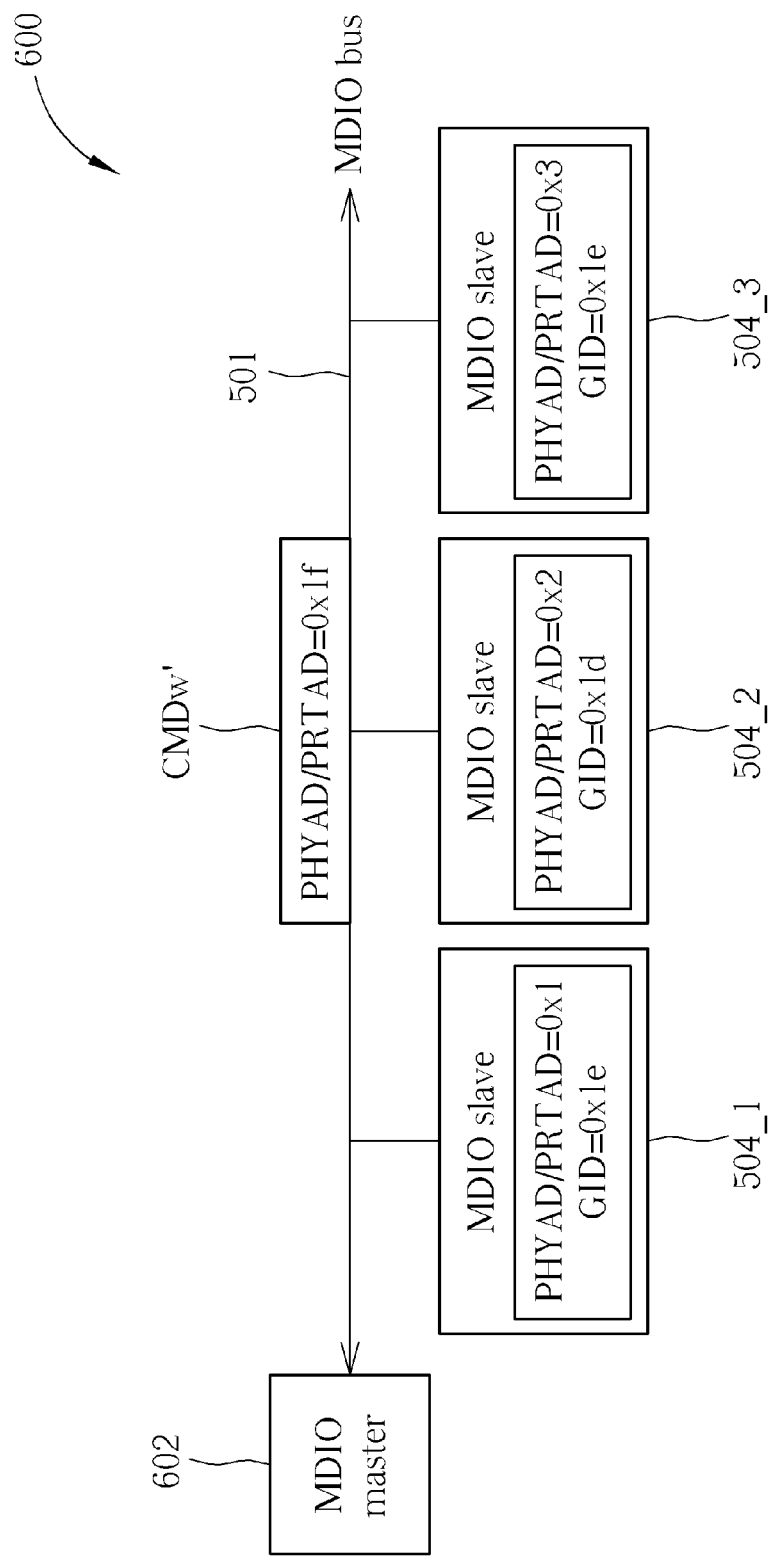
FIG. 6 is a diagram illustrating an electronic device according to a fourth embodiment of the present invention.

FIG. 6 is a diagram illustrating an electronic device according to a fourth embodiment of the present invention. In this embodiment, the electronic device 600 may be a network device (e.g., a switch). The major difference between the electronic devices 500 and 600 is that the MDIO master 602 generates an MDIO command (e.g., a write command $CMD_W'$) to the MDIO bus 501, where the transmission of the write command $CMD_W'$ has a corresponding MDIO frame structure defined by Clause 22/Clause 45 of IEEE 802.3 standard. In this embodiment, the write command $CMD_W'$ has a reserved physical layer (port) address (e.g., 0x1f) that is not used by any MDIO slave on the MDIO bus 501. Hence, the reserved physical layer (port) address (e.g., 0x1f) is ensured to be different from the designated physical layer (port) addresses and GIDs possessed by all MDIO slaves 504_1-504_3 on the MDIO bus 501.

In accordance with a conventional design, none of the MDIO slaves 504_1-504_3 is activated to execute the write command $CMD_W$. Since the reserved physical layer (port) address (e.g., 0x1f) does not match any of the pre-defined address settings (e.g., GID=0x1e and GID=0x1d), the aforementioned multicast function will not be enabled. However, in accordance with the proposed design of the present invention, the broadcast function of the write command $CMD_W'$ is enabled due to the reserved physical layer (port) address (e.g., 0x1f) included in the write command $CMD_W'$. That is, the reserved physical layer (port) address acts as a broadcast identifier, and all of the MDIO slaves 504_1-504_3 on the MDIO bus 501 are activated to execute the same write command $CMD_W'$. That is, the reserved physical layer (port) address acts as a broadcast identifier, and all have a reserved physical layer (port) address, the broadcast function of the MDIO command is enabled.

In above examples shown in FIG. 5 and FIG. 6, the broadcast/multicast function is controlled based on a physical layer (port) address included in an MDIO command. Alternatively, the broadcast/multicast function may be controlled based on a device address included in an MDIO command.

Figure 7:
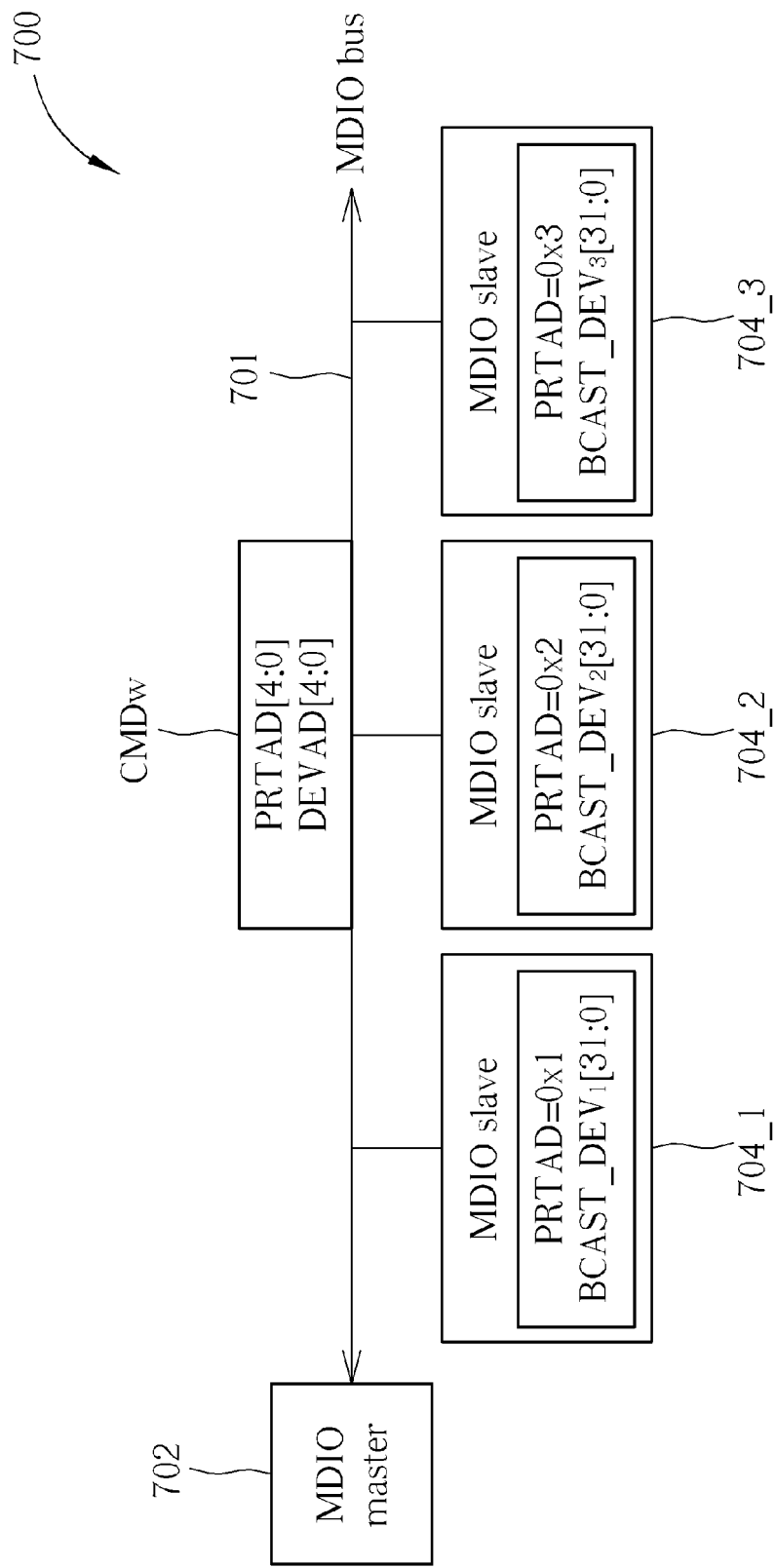
FIG. 7 is a diagram illustrating an electronic device according to a fifth embodiment of the present invention.

FIG. 7 is a diagram illustrating an electronic device according to a fifth embodiment of the present invention. In this embodiment, the electronic device 700 may be a network device (e.g., a switch). The electronic device 700 includes an MDIO bus 701, an MDIO master 702, and a plurality of MDIO slaves 704_1, 704_2, and 704_3. It should be noted that only the components pertinent to the present invention are shown in FIG. 7. For example, the MDC bus is not shown for clarity and simplicity. In practice, the electronic device 700 may include additional components to achieve other functions. Further, only three MDIO slaves are coupled to the same MDIO bus 701 controlled by the MDIO master 702. However, the number of MDIO slaves on the MDIO bus 701 may be adjusted, depending upon actual design consideration.

In this embodiment, each of the MDIO slaves 704_1-704_3 is configured to have a designated physical layer address (or called a port address PRTAD) and a 32-bit pre-defined address setting $BCAST\_DEV_1$ [31:0], $BCAST\_DEV_2$ [31:0], $BCAST\_DEV_3$ [31:0]. In this embodiment, the pre-defined address setting may be regarded as a group identifier used to define which MDIO slaves belong to the same group. As shown in FIG. 7, the MDIO slave 504_1 has a designated physical layer (port) address set by 0x1; the MDIO slave 504_2 has a designated physical layer (port) address set by 0x2, and the MDIO slave 504_3 has a designated physical layer (port) address set by 0x3. In this example shown in FIG. 7, the MDIO master 702 generates an MDIO command (e.g., a write command $CMD_W$) to the MDIO bus 701, where the transmission of the write command $CMD_W$ has a corresponding MDIO frame structure defined by Clause 45 of IEEE 802.3 standard. The write command $CMD_W$ has a 5-bit physical layer (port) address PRTAD [4:0] and a 5-bit device address DEVAD [4:0].

Consider a case where all of the MDIO slaves 704_1-704_3 on the same MDIO bus 701 have the same pre-defined address setting BCAST_DEV [31:0], i.e., BCAST_DEV [31:0]=$BCAST\_DEV_1$ [31:0]=$BCAST\_DEV_2$ [31:0]=$BCAST\_DEV_3$ [31:0]. Hence, the MDIO slaves 704_1-704_3 are categorized into the same group due to having the same group identifier BCAST_DEV [31:0]. Assume that the physical layer (port) address PRTAD [4:0] is set by 0x1e that is different from the designated physical layer (port) addresses possessed by the MDIO slaves 704_1-704_3, and the device address DEVAD [4:0] is set by BCAST_DEV [31:0] that is identical to pre-defined address settings possessed by the MDIO slaves 704_1-704_3. In accordance with a conventional design, none of the MDIO slaves 704_1-704_3 is activated to execute the write command $CMD_W$ because the physical layer (port) address PRTAD [4:0] included in the write command $CMD_W$ does not match any of the designated physical layer (port) addresses possessed by the MDIO slaves 704_1-704_3.

However, in accordance with the proposed design of the present invention, all of the MDIO slaves 704_1-704_3 are activated to execute the write command $CMD_W$ because the device address DEVAD [4:0] included in the write command $CMD_W$ matches each of the pre-defined address settings possessed by the MDIO slaves 704_1-704_3, thus achieving the multicast function. Specifically, the number of MDIO slaves, each coupled to the MDIO bus 701 and having the same pre-defined address setting, is equal to the number of all MDIO slaves 704_1-704_3 on the same MDIO bus 701 controlled by the MDIO master 702. When an MDIO command is controlled to have a device address set by the pre-defined address setting used by all of the MDIO slaves on the MDIO bus 701, the multicast function of the MDIO command is enabled.

Figure 8:
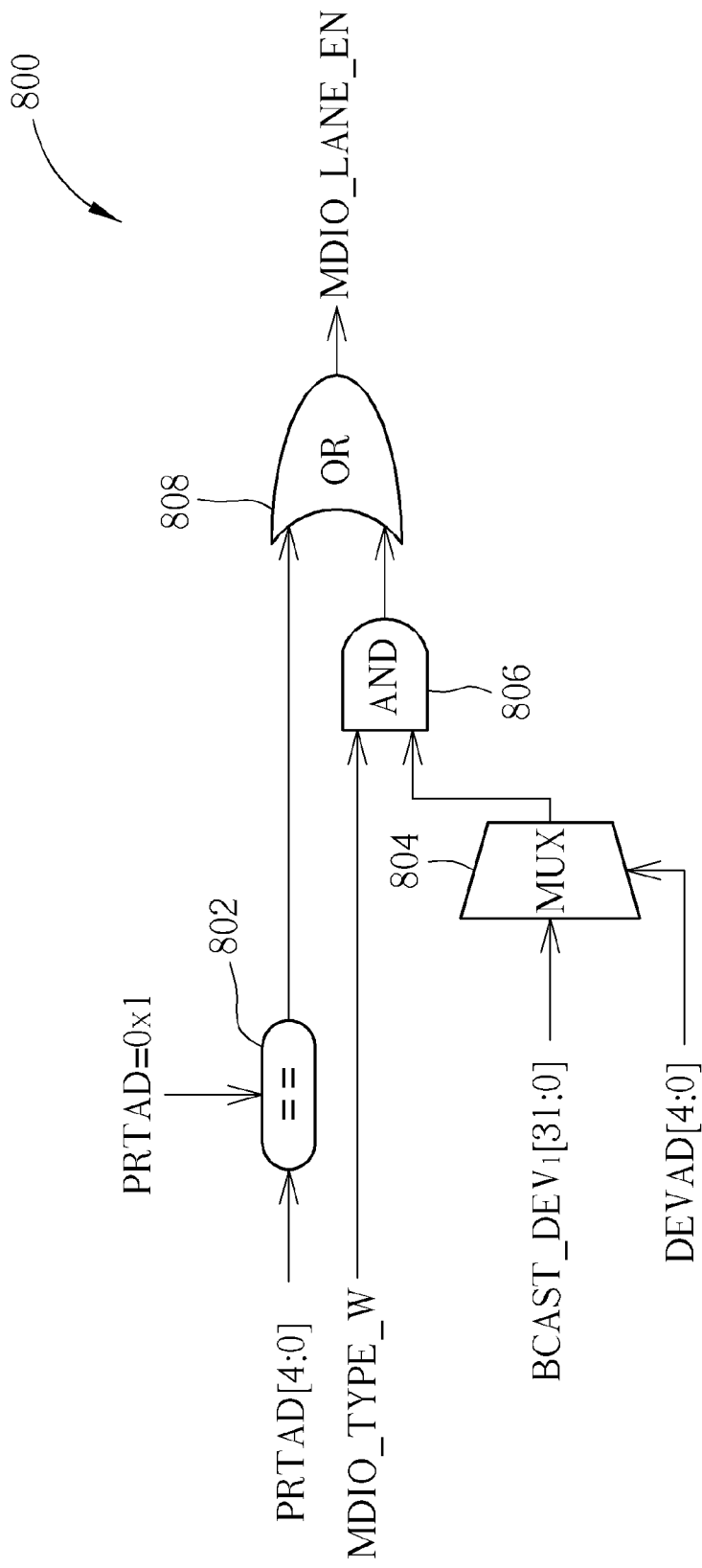
FIG. 8 is a diagram illustrating a decision logic implemented in an MDIO slave according to an embodiment of the present invention.

FIG. 8 is a diagram illustrating a decision logic implemented in an MDIO slave according to an embodiment of the present invention. The MDIO slaves 704_1-704_3 may have the same decision logic design. Taking the MDIO slave 704_1 for example, the decision logic 800 includes a comparator 802, a multiplexer (MUX) 804, an AND logic gate 806, and an OR logic gate 808. The comparator 802 compares the designated physical layer (port) address PRTAD=0x1 with the physical layer (port) address PRTAD [4:0] included in an MDIO command (e.g., write command $CMD_W$). When the physical layer (port) address PRTAD [4:0] matches the designated physical layer (port) address PRTAD=0x1, the comparator 802 outputs a logic high value "1" to the OR logic gate 808, such that the enable signal MDIO_LANE_EN is set by the logic high value "1" for activating the MDIO slave 704_1 to execute the MDIO command (e.g., write command $CMD_W$) on the MDIO bus 701.

When the physical layer (port) address PRTAD [4:0] does not match the designated physical layer (port) address PRTAD=0x1, the comparator 802 outputs a logic low value "0" to the OR logic gate 808. As shown in FIG. 8, another input of the OR logic gate 808 is provided by the AND logic gate 806. Hence, when the physical layer (port) address PRTAD [4:0] does not match the designated physical layer (port) address PRTAD=0x1, the enable signal MDIO_LANE_EN may be set by the logic high value "1" in response to a logic high value "1" generated from the AND logic gate 806. One input of the AND logic gate 806 is set by the command type MDIO_TYPE_W. When the MDIO command is a write command, the command type MDIO_TYPE_W has the logic high value "1", and when the MDIO command is not a write command, the command type MDIO_TYPE_W has the logic low value "0". In this example, the MDIO command is the write command $CMD_W$, such that the command type MDIO_TYPE_W is set by the logic high value "1". The multiplexer 804 is used to decide whether the device address DEVAD [4:0] included in the write command $CMD_W$ matches the pre-defined address setting $BCAST\_DEV_1$ [31:0]. The device address DEVAD [4:0] has 5 bits and therefore supports 32 possible values. The pre-defined address setting $BCAST\_DEV_1$ [31:0] has 32 bits, where each of one or more bits can be set by the logic high value "1" for identifying corresponding device, while each of the remaining bits is set by the logic low value "0". Thus, the pre-defined address setting $BCAST\_DEV_1$ [31:0] corresponds to one of the 32 possible values supported by the device address DEVAD [4:0]. The device address DEVAD [4:0] acts as a selection signal of the multiplexer 804. When the device address DEVAD [4:0] matches the pre-defined address setting $BCAST\_DEV_1$ [31:0], the multiplexer 804 selects and outputs the logic high value "1".

However, when the device address DEVAD [4:0] does not match the pre-defined address setting $BCAST\_DEV_1$ [31:0], the multiplexer 804 selects and outputs the logic low value "0". Hence, when the MDIO command is the write command CMD and the device address DEVAD [4:0] included in the write command CMD matches the pre-defined address setting $BCAST\_DEV_1$ [31:0], the AND logic gate 806 outputs a logic high value "1" to the OR logic gate 808. No matter whether the physical layer (port) address PRTAD [4:0] matches the designated physical layer (port) address PRTAD=0x1 or not, the enable signal MDIO_LANE_EN is set by the logic high value "1" generated from the AND logic gate 806 for activating the MDIO slave 704_1 to execute the MDIO command (e.g., write command $CMD_W$) on the MDIO bus 701.

Consider another case where not all of the MDIO slaves 704_1-704_3 on the MDIO bus 701 have the same pre-defined address setting. For example, the MDIO slaves 704_1 and 704_3 may have the same pre-defined address setting BCAST_DEV [31:0], i.e., BCAST_DEV [31:0]= $BCAST\_DEV_1$ [31:0]=$BCAST\_DEV_3$ [31:0], while the MDIO slave 704_2 may have a different pre-defined address setting, i.e., $BCAST\_DEV_3$ [31:0]≠BCAST_DEV [31:0]. Hence, the MDIO slaves 704_1 and 704_3 are categorized into the same group due to having the same group identifier BCAST_DEV [31:0]. Assume that the physical layer (port) address PRTAD [4:0] is set by 0x1e that is different from the designated physical layer (port) addresses possessed by the MDIO slaves 704_1-704_3, and the device address DEVAD [4:0] is set by BCAST_DEV [31:0] that is identical to pre-defined address settings possessed by the MDIO slaves 704_1 and 704_3. In accordance with a conventional design, none of the MDIO slaves 704_1-704_3 is activated to execute the write command $CMD_W$ because the physical layer (port) address PRTAD [4:0] included in the write command $CMD_W$ does not match any of the designated physical layer (port) addresses possessed by the MDIO slaves 704_1-704_3.

However, in accordance with the proposed design of the present invention, the MDIO slaves 704_1 and 704_3 are activated to execute the write command $CMD_W$ because the device address DEVAD [4:0] included in the write command $CMD_W$ matches the pre-defined address settings possessed by the MDIO slaves 704_1 and 704_3. In this way, the multicast function is achieved. Specifically, the number of MDIO slaves, each coupled to the MDIO bus 701 and having the same specific pre-defined address setting, is smaller than the number of all MDIO slaves 704_1-704_3 on the same MDIO bus 701 controlled by the MDIO master 702. When an MDIO command is controlled to have a device address set by a pre-defined address setting used by some of the MDIO slaves on the MDIO bus 701, the multicast function of the MDIO command is enabled.

To enhance the robustness of MDC/MDIO protocol, the present invention further proposes a write verification procedure for a write operation and a deglitch procedure for a read operation. Further details are described as below.

Figure 9:
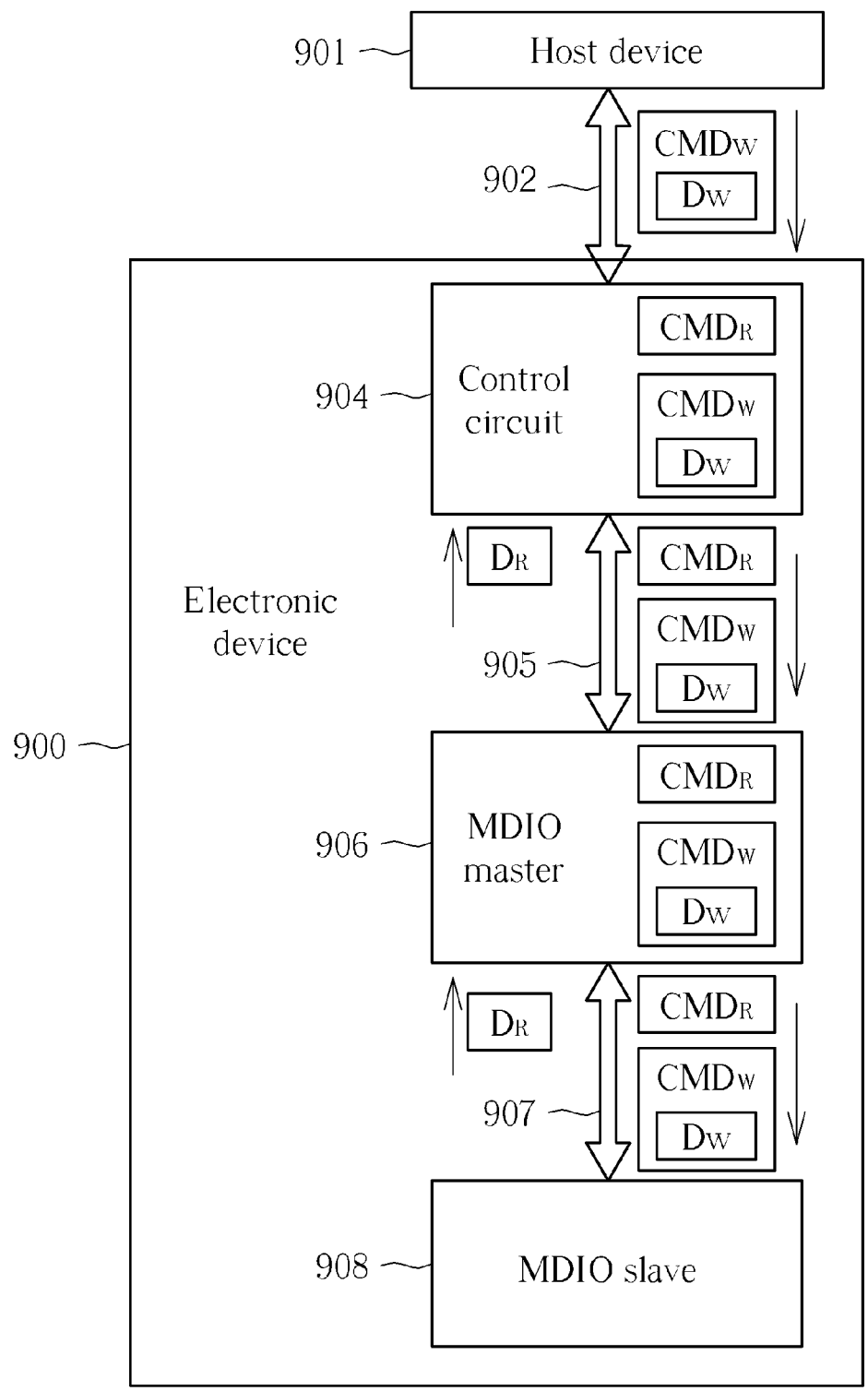
FIG. 9 is a diagram illustrating an electronic device according to a sixth embodiment of the present invention.

FIG. 9 is a diagram illustrating an electronic device according to a sixth embodiment of the present invention. In this embodiment, the electronic device 900 may be a network device (e.g., a switch). The electronic device 900 communicates with a host device (e.g., a host processor) 901 via a bus 902. For example, the bus 902 may be a PCI Express bus. The electronic device 900 includes a control circuit 904, an internal bus 905, an MDIO master 906, an MDIO bus 907, and at least one MDIO slave 908. It should be noted that only the components pertinent to the present invention are shown in FIG. 9. For example, the MDC bus is not shown for clarity and simplicity. In practice, the electronic device 900 may include additional components to achieve other functions. Further, the number of MDIO slaves on the MDIO bus 907 may be adjusted, depending upon actual design consideration.

The control circuit 904 receives a host command (e.g., a single command such as an MDIO write command $CMD_W$) and its associated write data $D_W$ generated from the host device 901 and transmitted via the bus 902. Next, the control circuit 904 outputs a plurality of MDIO commands in response to the MDIO write command $CMD_W$. In this embodiment, the control unit 904 automatically appends an MDIO read command $CMD_R$ to the MDIO write command $CMD_W$, and then transmits the MDIO write command CMD and the MDIO read command $CMD_R$ to the internal bus 905. Hence, the MDIO master 906 receives the MDIO write command CMD and the MDIO read command $CMD_R$ from the control unit 904, and transmits the MDIO write command $CMD_W$ and the MDIO read command $CMD_R$ to the MDIO bus 307, where the transmission of each of the MDIO write command $CMD_W$ and the MDIO read command $CMD_R$ follows a corresponding MDIO frame structure defined by Clause 22/Clause 45 of IEEE 802.3 standard.

Specifically, the MDIO master 906 transmits the write data $D_W$ to the MDIO slave 908 according to the MDIO write command $CMD_W$. When the MDIO bus 907 is designed based on Clause 22 of IEEE 802.3 standard, a write address is embedded in the MDIO write command $CMD_W$. When the MDIO bus 907 is designed based on Clause 45 of IEEE 802.3 standard, a write address is included in an additional set-address command (not shown) preceding the MDIO write command $CMD_W$. Further, the MDIO master 906 receives a read data $D_R$ from the MDIO slave 908 according to the MDIO read command $CMD_R$. When the MDIO bus 907 is designed based on Clause 22 of IEEE 802.3 standard, a read address is embedded in the MDIO read command $CMD_R$. When the MDIO bus 907 is designed based on Clause 45 of IEEE 802.3 standard, a read address is included in an additional set-address command (not shown) preceding the MDIO read command $CMD_R$. It should be noted that the read address (i.e., a register address) is intentionally set by the write address (i.e., a register address) of the write data $D_W$. Hence, after the write data $D_W$ is stored into the write address, the MDIO read command $CMD_R$ is executed by the MDIO slave 908 to read a stored data from the write address to output the read data $D_R$. After receiving the read data $D_R$ through the MDIO master 906, the control unit 904 compares the write data $D_W$ and the read data $D_R$ for write verification.

Figure 10:
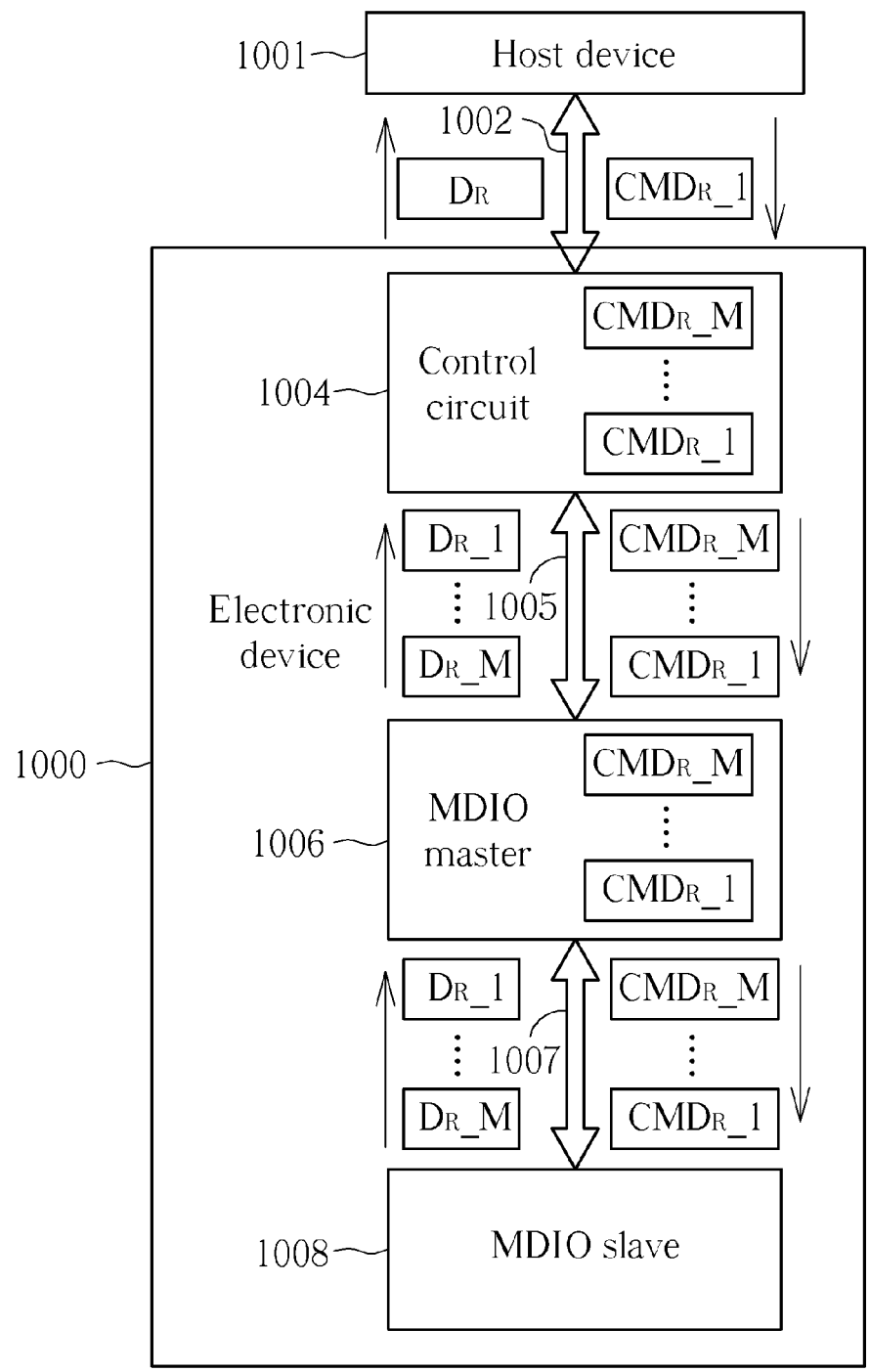
FIG. 10 is a diagram illustrating an electronic device according to a seventh embodiment of the present invention.

FIG. 10 is a diagram illustrating an electronic device according to a seventh embodiment of the present invention. In this embodiment, the electronic device 1000 may be a network device (e.g., a switch). The electronic device 1000 communicates with a host device (e.g., a host processor) 1001 via a bus 1002. For example, the bus 1002 may be a PCI Express bus. The electronic device 1000 includes a control circuit 1004, an internal bus 1005, an MDIO master 1006, an MDIO bus 1007, and at least one MDIO slave 1008. It should be noted that only the components pertinent to the present invention are shown in FIG. 10. For example, the MDC bus is not shown for clarity and simplicity. Further, the number of MDIO slaves on the MDIO bus 1007 may be adjusted, depending upon actual design consideration.

The control circuit 1004 receives a host command (e.g., a single command such as an MDIO read command $CMD_R\_1$) generated from the host device 1001 and transmitted via the bus 1002. Next, the control circuit 1004 outputs a plurality of MDIO commands in response to the MDIO read command $CMD_R\_1$. In this embodiment, the control unit 1004 automatically appends at least one MDIO read command to the MDIO read command $CMD_R\_1$, and then transmits the MDIO read command $CMD_R\_1$-$CMD_R\_M$ to the internal bus 1005, where M is a positive integer equal to or larger than 2. Hence, the MDIO master 1006 receives the MDIO read command $CMD_R\_1$-$CMD_R\_M$ from the control unit 1004, and transmits the MDIO read command $CMD_R\_1$-$CMD_R\_M$ to the MDIO bus 1007, where the transmission of each of MDIO read command $CMD_R\_1$-$CMD_R\_M$ follows a corresponding MDIO frame structure defined by Clause 22/Clause 45 of IEEE 802.3 standard.

When the MDIO bus 1007 is designed based on Clause 22 of IEEE 802.3 standard, a read address is embedded in each of the MDIO read command $CMD_R\_1$-$CMD_R\_M$. When the MDIO bus 1007 is designed based on Clause 45 of IEEE 802.3 standard, a read address is included in an additional set-address command (not shown) preceding each of the MDIO read commands $CMD_R\_1$-$CMD_R\_M$. Further, the MDIO master 1006 receives a plurality of read data $D_R1$-$D_R\_M$ from the MDIO slave 1008 according to the MDIO read commands $CMD_R\_1$-$CMD_R\_M$. It should be noted that the read addresses corresponding to the MDIO read commands $CMD_R\_1$-$CMD_R\_M$ are the same. Hence, the read data $D_R1$-$D_R\_M$ are obtained by repeatedly reading a stored data from the same read address in the MDIO slave 1008. After receiving the read data $D_R1$-$D_R\_M$ through the MDIO master 1006, the control unit 1004 compares the read data $D_R1$-$D_R\_M$ for read deglitch. For example, a majority vote method may be employed by the control unit 1004 to determine a final read data $D_F$ from the read data $D_R1$-$D_R\_M$. That is, when most of the read data $D_R1$-$D_R\_M$ are the same, this read data that is a majority of the read data $D_R1$-$D_R\_M$ is selected as the final read data $D_F$. However, this is for illustrative purposes only, and is not meant to be a limitation of the present invention.

As mentioned above, the MDIO commands defined by Clause 45 of IEEE 802.3 standard include a set-address command, a read command, a write command, and a post-read-increment-address command. For a burst write operation for writing data into continuous write addresses (i.e., register addresses), the conventional MDIO master needs to send one set-address command before each write command. To increase the bus utilization, the present invention therefore proposes a write-incremental function. For example, the aforementioned MDIO masters and MDIO slave may be configured to support the proposed write-incremental function.

Figure 11:
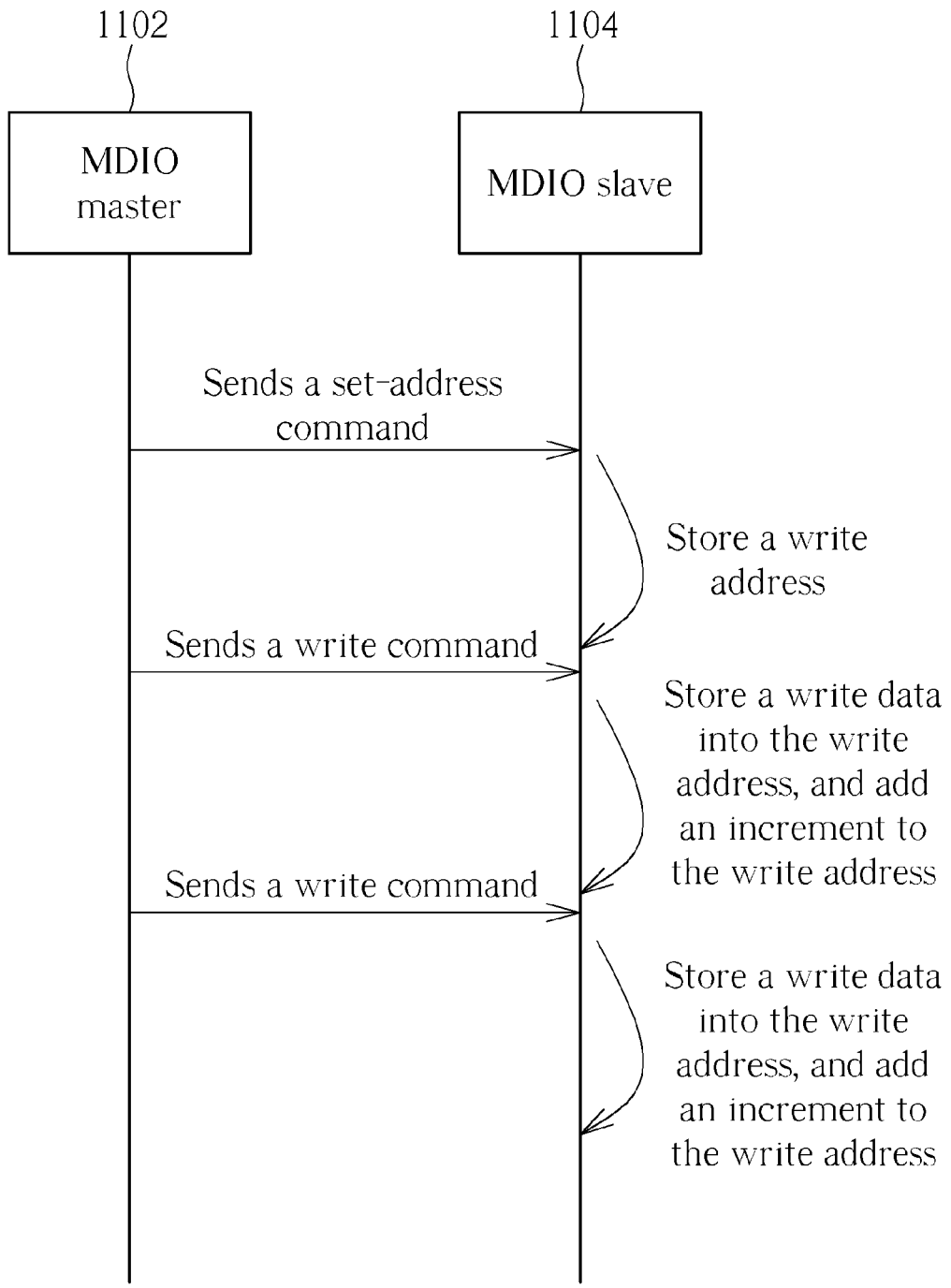
FIG. 11 is a sequence diagram illustrating a burst write operation according to an embodiment of the present invention.

FIG. 11 is a sequence diagram illustrating a burst write operation according to an embodiment of the present invention. The burst write operation is achieved using the proposed write-incremental function. The MDIO slave 1104 is coupled to an MDIO bus controlled by the MDIO master 1102, where each MDIO command transmitted on the MDIO bus follows an MDIO frame structure defined by Clause 45 of IEEE 802.3 standard. At the beginning of the burst write operation, the MDIO master 1102 sends a set-address command, and the MDIO slave 1104 executes the set-address command to store a write address (e.g., a first register address). Next, the MDIO master 1102 sends a write command, and the MDIO slave 1104 executes the write command to store a write data associated with the write command into the write address (e.g., the first register address), and adds an increment (e.g., +1) to the write address (e.g., the first register address) to generate and store another write address (e.g., a second register address). Next, the MDIO master 1102 sends another write command, and the MDIO slave 1104 executes the write command to store a write data associated with the write command into the write address (e.g., the second register address), and adds an increment (e.g., +1) to the write address (e.g., the second register address) to generate and store another write address. In one exemplary design, the MDIO master 1102 may be configured to send a new set-address command to terminate the write-incremental function.

Figure 12:
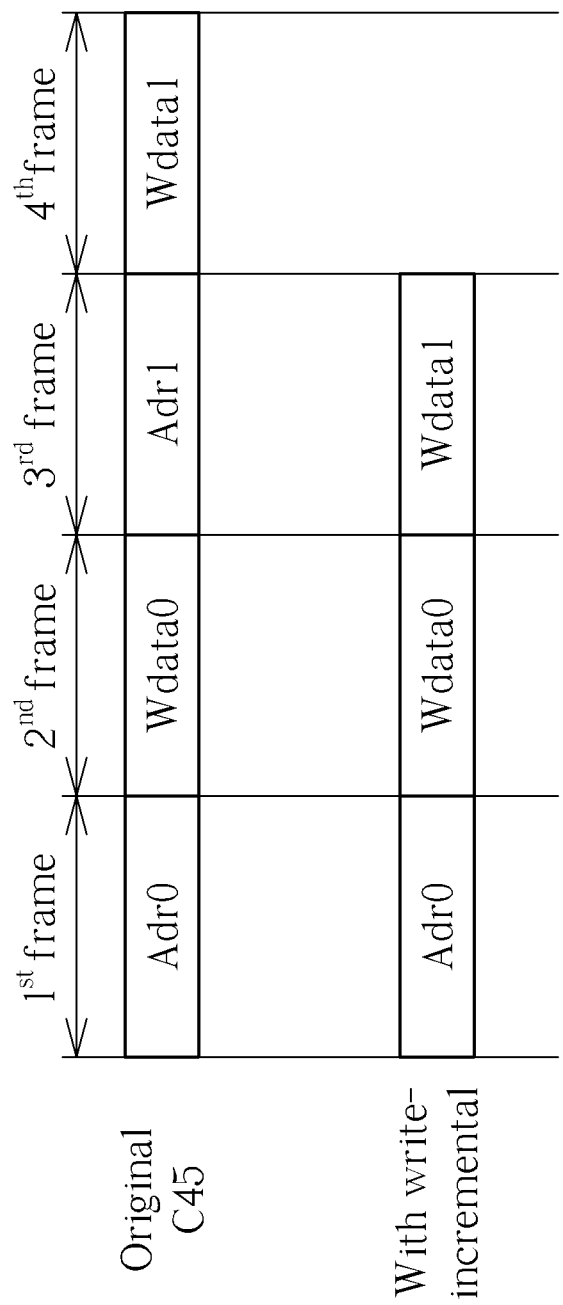
FIG. 12 is a diagram illustrating a comparison between a burst write operation achieved using the proposed write-incremental function and a conventional burst write operation achieved using MDIO commands defined by Clause 45 of IEEE 802.3 standard.

FIG. 12 is a diagram illustrating a comparison between a burst write operation achieved using the proposed write-incremental function and a conventional burst write operation achieved using MDIO commands defined by Clause 45 of IEEE 802.3 standard. Concerning the conventional burst write operation, an MDIO master needs to send one set-address command including a write address (i.e., a register address) Adr0, send one write command including a write data Wdata0, send another set-address command including a next write address (i.e., a next register address) Adr1, and send another write command including a write data Wdata1. Hence, four MDIO frames are needed to accomplish the burst write operation of write data Wdata0 and Wdata1. Concerning the burst write operation of the present invention, an MDIO master needs to send one set-address command including a write address (i.e., a register address) Adr0, send one write command including a write data Wdata0, and send another write command including a write data Wdata1. Hence, three MDIO frames are needed to accomplish the burst write operation of write data Wdata0 and Wdata1. The proposed write-incremental function is capable of enhancing the bus utilization due to using fewer MDIO frames to accomplish the burst write operation.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An electronic device, comprising:
a management data input/output (MDIO) bus;
a control circuit, configured to receive a host command from a host device, and output a plurality of MDIO commands in response to the host command; and
an MDIO master, configured to receive the MDIO commands from the control circuit, and transmit the MDIO commands to the MDIO bus;
wherein the MDIO commands are configured to be executed by a same MDIO slave on the MDIO bus;
wherein the host command is an MDIO write command, and the MDIO commands comprise an MDIO write command and an MDIO read command.

2. The electronic device of claim 1, wherein the MDIO mater is further configured to transmit a write data to the MDIO slave according to the MDIO write command, and receive a read data from the MDIO slave according to the MDIO read command; and the control unit is further configured to compare the write data and the read data for write verification.

3. An electronic device, comprising:
a management data input/output (MDIO) bus;
a control circuit, configured to receive a host command from a host device, and output a plurality of MDIO commands in response to the host command; and
an MDIO master, configured to receive the MDIO commands from the control circuit, and transmit the MDIO commands to the MDIO bus;
wherein the MDIO commands are configured to be executed by a same MDIO slave on the MDIO bus;
wherein the host command is an MDIO read command, and the MDIO commands comprise a plurality of MDIO read commands having a same read address in said same MDIO slave.

4. The electronic device of claim 3, wherein the MDIO mater is further configured to receive a plurality of read data from the MDIO slave according to the MDIO read commands; and the control circuit is further configured to compare the plurality of read data for read deglitch.

* * * * *